United States Patent
Yoshizaki

(10) Patent No.: US 12,475,715 B2
(45) Date of Patent: Nov. 18, 2025

(54) INFORMATION PROCESSING DEVICE AND VEHICLE

(71) Applicant: TOYOTA JIDOSHA KABUSHIKI KAISHA, Toyota (JP)

(72) Inventor: Yasunao Yoshizaki, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 327 days.

(21) Appl. No.: 18/316,306

(22) Filed: May 12, 2023

(65) Prior Publication Data

US 2023/0419684 A1    Dec. 28, 2023

(30) Foreign Application Priority Data

Jun. 24, 2022   (JP) .................. 2022-102246

(51) Int. Cl.
*G06V 20/58* (2022.01)
*B60W 40/08* (2012.01)
*G06V 40/16* (2022.01)

(52) U.S. Cl.
CPC ............ *G06V 20/58* (2022.01); *B60W 40/08* (2013.01); *G06V 40/166* (2022.01); *B60W 2040/0809* (2013.01); *B60W 2420/403* (2013.01)

(58) Field of Classification Search
CPC ..... G06V 20/58; G06V 40/166; B60W 40/08; B60W 2040/0809; B60W 2420/403
See application file for complete search history.

(56) References Cited

U.S. PATENT DOCUMENTS

| | | | |
|---|---|---|---|
| 2019/0346701 A1 | 11/2019 | Lam et al. | |
| 2021/0001697 A1* | 1/2021 | Ahn ........................ | B60J 1/18 |
| 2022/0396148 A1* | 12/2022 | Rodrigues ............. | B60K 35/00 |

FOREIGN PATENT DOCUMENTS

| | | |
|---|---|---|
| JP | 2008189202 A | 8/2008 |
| JP | 2011-201343 A | 10/2011 |
| JP | 2021-526093 A | 9/2021 |
| JP | 2022-002923 A | 1/2022 |

* cited by examiner

*Primary Examiner* — Stephen G Sherman
(74) *Attorney, Agent, or Firm* — Dickinson Wright, PLLC

(57) ABSTRACT

An information processing device comprises a controller configured to execute: detecting that a confirmation operation that is an operation of visually confirming a side portion of a first vehicle is performed by a driver of the first vehicle; and performing control that sets transmittance of a window lying in a corresponding direction at a predetermined value if the confirmation operation is detected.

17 Claims, 15 Drawing Sheets

| ADVERTISE-MENT ID | GENRE | TYPE | POSTING AREA | POSTING HOURS | DURATION OF POSTING | NUMBER OF VEHICLES FOR POSTING | REQUIREMENTS FOR VEHICLE | CONTENT DATA |
|---|---|---|---|---|---|---|---|---|
| A101 | PRODUCT INFORMATION | STILL IMAGE | SHINJUKU | 12:00-13:00 | 30min | 3 | ... | (Binary) |
| A102 | SHOP INFORMATION | SLIDE SHOW | SHIBUYA | 18:00-24:00 | 60min | 2 | ... | (Binary) |
| A103 | EVENT INFORMATION | MOVING IMAGE | ... | ... | ... | 1 | ... | (Binary) |
| ... | ... | ... | ... | ... | ... | ... | ... | ... |

FIG. 7

VEHICLE INFORMATION TABLE

| VEHICLE ID | VEHICLE TYPE | DISPLAY DEVICE INFORMATION #1 | | DISPLAY DEVICE INFORMATION #2 | | DISPLAY DEVICE INFORMATION #3 | | |
|---|---|---|---|---|---|---|---|---|
| | | POSITION | AREA | POSITION | AREA | POSITION | AREA | |
| V101 | SEDAN | LEFT SIDE SURFACE FRONT | 50 | LEFT SIDE SURFACE REAR | 50 | LEFT SIDE SURFACE FRONT | 50 | ... |
| V102 | MINIVAN | LEFT SIDE SURFACE REAR | 75 | RIGHT SIDE SURFACE REAR | 75 | REAR | 100 | ... |
| V103 | TRUCK | LEFT SIDE SURFACE REAR | 200 | RIGHT SIDE SURFACE REAR | 200 | REAR | 100 | ... |
| ... | ... | ... | ... | ... | ... | ... | ... | ... |

FIG. 8

| VEHICLE ID | DATE | TIME | POSITION INFORMATION | TRAVELING DIRECTION | VELOCITY | ADVERTISEMENT OUTPUT STATUS | POSTED ADVERTISEMENT ID | ... |
|---|---|---|---|---|---|---|---|---|
| V101 | 2018/7/12 | 12:00 | ... | ... | ... | OUTPUTTING | A101 | ... |
| V101 | 2018/7/12 | 12:01 | ... | ... | ... | OUTPUTTING | A101 | ... |
| V101 | 2018/7/12 | 12:02 | ... | ... | ... | NO OUTPUT | A102 | ... |
| V101 | 2018/7/12 | 12:03 | ... | ... | ... | OUTPUTTING | A102 | ... |
| V101 | 2018/7/12 | 12:04 | ... | ... | ... | NO OUTPUT | A103 | ... |
| ... | | | | | | ... | | |

FIG. 9

| SHIFT POSITION | DISPLAY DEVICE | | |
| --- | --- | --- | --- |
| | LEFT REAR | RIGHT REAR | BACK SURFACE |
| PARK | NOT CONTROLLED | NOT CONTROLLED | NOT CONTROLLED |
| DRIVE | CONTROLLED | CONTROLLED | NOT CONTROLLED |
| REVERSE | CONTROLLED | CONTROLLED | CONTROLLED |

FIG. 15

INFORMATION PROCESSING DEVICE AND VEHICLE

CROSS REFERENCE TO THE RELATED APPLICATION

This application claims the benefit of Japanese Patent Application No. 2022-102246, filed on Jun. 24, 2022, which is hereby incorporated by reference herein in its entirety.

BACKGROUND

Technical Field

The present disclosure relates to a driving aid function of a vehicle.

Description of the Related Art

A technique for electronically controlling transmittance of a window of an automobile has been proposed.

As for this, for example, Japanese Patent Laid-Open No. 2008-189202 discloses a vehicle system which changes transmittance to suit a situation by applying a voltage to an element built into a window.

SUMMARY

It is an object of the present disclosure to enhance running safety of a vehicle.

The present disclosure in its one aspect provides an information processing device comprising a controller configured to execute: detecting that a confirmation operation that is an operation of visually confirming a side portion of a first vehicle is performed by a driver of the first vehicle; and performing control that sets transmittance of a window lying in a corresponding direction at a predetermined value if the confirmation operation is detected.

The present disclosure in its another aspect provides a vehicle comprising a display device that outputs a video using a window as a medium and a control device, wherein the display device includes a first unit configured to output the video and a second unit configured to change transmittance of the window, wherein the control device includes a controller configured to execute: detecting that a confirmation operation that is an operation of visually confirming a side portion of the vehicle is performed by a driver; and performing control that sets the transmittance of the window lying in a corresponding direction at a predetermined value if the confirmation operation is detected.

Other aspects include a method to be executed by the above-described device and a program for causing a computer to execute the method and a computer-readable storage medium non-transitorily storing the program.

According to the present disclosure, it is possible to enhance running safety of a vehicle.

BRIEF DESCRIPTION OF THE DRAWINGS

FIG. 7 is an example of data to be stored in an advertisement information database;

FIG. 8 is an example of data to be stored in a vehicle information database;

FIG. 9 is an example of data to be stored in a running history database;

FIG. 15 is an example of data defining a relationship between a vehicle status and a window as a control object.

DESCRIPTION OF THE EMBODIMENTS

Figure 1:
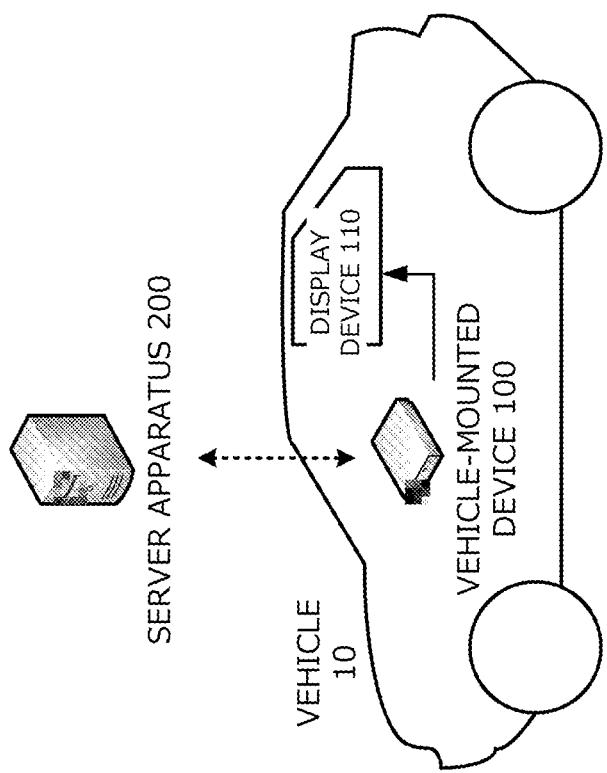
FIG. 1 is a schematic diagram of a vehicle system according to a first embodiment.

There is glass available, transmittance of which can be adaptively changed. For example, a plate glass, darkness of which can be dynamically changed by applying a voltage to a built-in element, is known. Application of the plate glass to a windowpane of an automobile makes it possible to appropriately prevent direct exposure to sunlight in accordance with a situation.

The above-described glass can be used for purposes besides protection against the sun.

For example, there is a technique available for building a display panel serving as a display into a windowpane and outputting a video. Sandwiching the display panel between two sheets of glasses with changeable transmittance makes it possible to switch between a mode of playing a video toward a vehicle interior and a mode of playing a video toward a vehicle exterior. This allows outputting advertisement during running, providing information or entertainment to an occupant in a vehicle, and the like.

A windowpane with changeable transmittance can be mainly installed at a backseat.

However, if transmittance of a windowpane is reduced, it becomes hard to view a vehicle exterior from a vehicle interior. That is, the reduction may interfere with a visual confirmation by a driver at the time of changing lanes or turning right or left.

In order to solve the above-described problem, it is preferable to appropriately control transmittance of a windowpane in accordance with a vehicle driving situation.

An information processing device according to the present disclosure solves the problem.

An information processing device according to one aspect of the present disclosure includes a controller configured to execute detecting that a confirmation operation that is an operation of visually confirming a side portion of a first vehicle is performed by a driver of the first vehicle and performing control that sets transmittance of a window lying in a corresponding direction at a predetermined value if the confirmation operation is detected.

The confirmation operation is an operation of directly making a visual confirmation of the side portion of the vehicle. The confirmation operation is performed by, for example, an occupant (driver) sitting in a driver seat. Note that the side portion of the vehicle includes not only a portion in the middle of a side of the vehicle but also a diagonally rear portion of the vehicle.

When the driver performs the confirmation operation, the driver needs to visually recognize a vehicle exterior from a vehicle interior through a windowpane. For this reason, the controller performs control that sets the transmittance of the window lying in the corresponding direction (i.e., a direction in which the driver wants to make visual contact) at the predetermined value if the confirmation operation is detected. The predetermined value is preferably a value which does not interfere with visual contact with the vehicle exterior.

For example, if the transmittance of the window as an object is set low for protection against the sun, the setting is temporarily canceled to view the vehicle exterior from the vehicle interior. This allows ensuring of safety.

Note that a plurality of windows of the first vehicle may be ones capable of video output. Alternatively, the windows may be ones of a type which decreases in transmittance at the time of video output.

If the window as the object is of a type which shows a video by decreasing transmittance, the transmittance can be increased by stopping video output.

The controller may detect the confirmation operation by a camera which captures a face of the driver. For example, an in-vehicle camera or the like for prevention of drowsy driving can detect that the driver is about to perform the confirmation operation.

Additionally, the controller may detect a sign of the confirmation operation based on data acquired from a vehicle platform and preparatorily change transmittance of a windowpane in response to the sign. A judgment on the sign of the confirmation operation can be made based on, for example, an operation status of blinkers or the like. For example, if a right-side (left-side) blinker operates, transmittance of a right-side (left-side) window may be set at the predetermined value. According to this configuration, it is possible to quickly create a state in which a windowpane is transmissive without waiting for detection of the confirmation operation.

In addition, a vehicle status may be associated in advance with a window as an object to be subjected to control that changes transmittance, and a window to be changed in transmittance may be determined using the association.

For example, when the vehicle is in a parked state, video output should not be stopped even if the driver looks back. As described above, a window to be changed in transmittance can also be determined based on the vehicle status.

Specific embodiments of the present disclosure will be described below with reference to the drawings. A hardware configuration, a module configuration, a functional configuration, and the like described in each embodiment are not intended to limit the technical scope of the disclosure thereto unless otherwise described.

First Embodiment

An outline of a vehicle system according to a first embodiment will be described with reference to FIG. 1. The vehicle system according to the present embodiment is configured to include a vehicle 10 equipped with a vehicle-mounted device 100 and a display device 110, and a server apparatus 200.

The vehicle 10 is an automobile including a plurality of display devices 110 and can post an advertisement via the display device 110 based on advertisement content received from the server apparatus 200. Note that, in the present embodiment, advertisement posting refers to outputting image data or the like to the display device 110 and causing the display device 110 to display a still image or a moving image.

The vehicle 10 can receive advertisement content data (advertisement data) delivered from the server apparatus 200 and output advertisement content, such as a still image, a slide show, and a moving image, to an outside of the vehicle 10 via the plurality of display devices 110.

Figure 2:
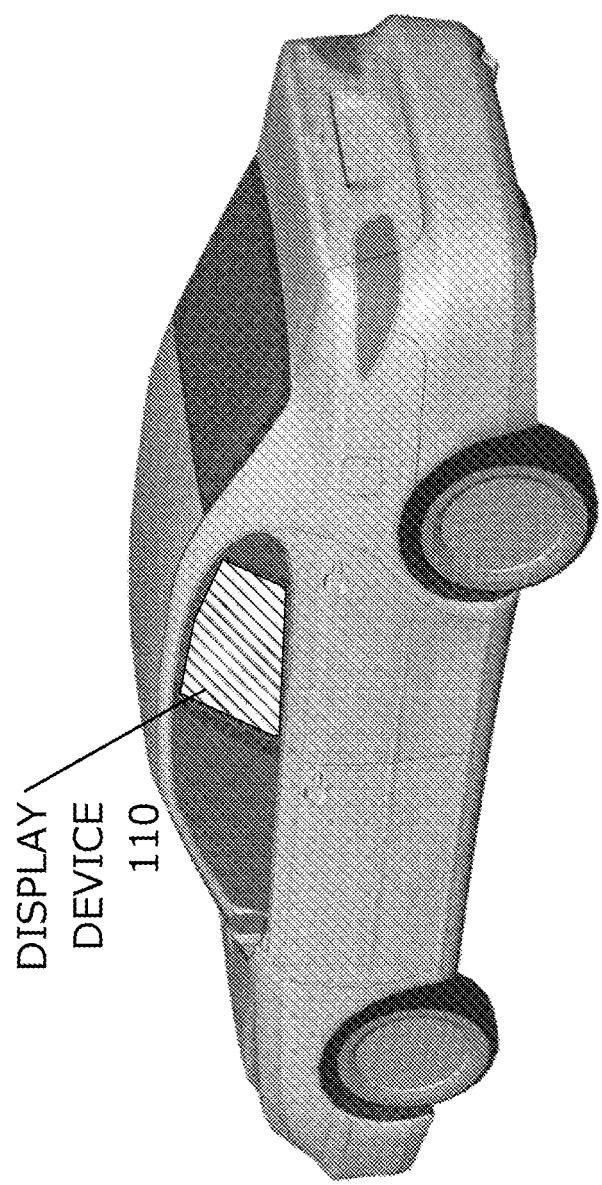
FIG. 2 is a view for explaining an arrangement position of a display device 110.

The display device 110 is a display device built into a windowpane. FIG. 2 is a view for explaining an installment position of the display device 110. Note that, although the display device 110 installed on a left side of a vehicle rear portion is illustrated as an example in the present example, the display device 110 may be installed on a right side of the vehicle rear portion. Alternatively, the display device 110 may be installed at a rear of the vehicle.

The display device 110 can be constructed using a liquid crystal display (LCD), an organic EL (Electro-Luminescence) display, an LED (Light Emitting Diode) matrix, a projector, or the like.

Figure 3:
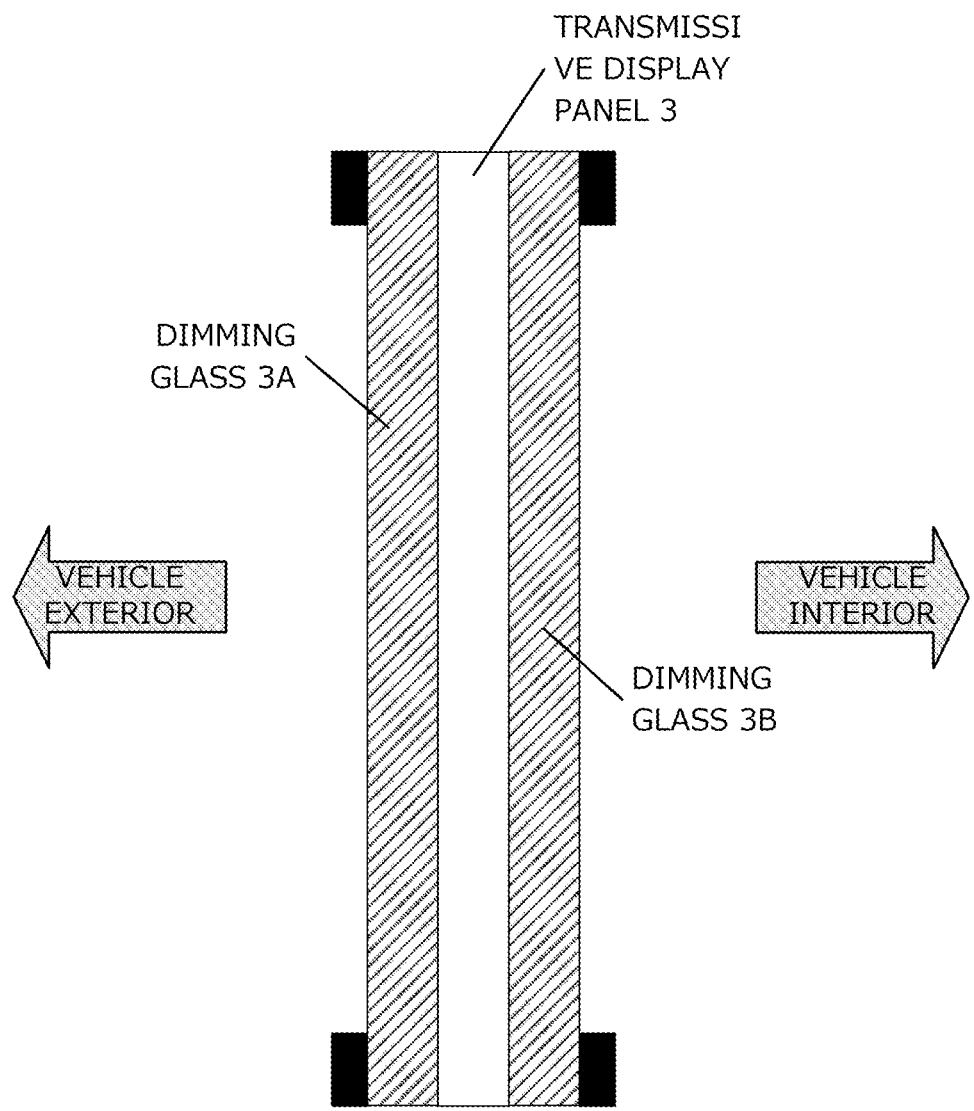
FIG. 3 is a sectional view of glasses of the display device 110.

In the present embodiment, the display device 110 can be configured to include a transmissive display panel and a dimming glass with changeable transmittance. FIG. 3 is a view illustrating a section of a windowpane. As illustrated in FIG. 3, a windowpane of the vehicle 10 is constructed by sandwiching a transmissive display panel 3 (a first unit) between two sheets of dimming glass 3A and 3B (a second unit).

For example, to show a video in a vehicle exterior direction, transmittance of the dimming glass 3A is maximized, and transmittance of the dimming glass 3B is minimized. To show a video in a vehicle interior direction, the transmittance of the dimming glass 3A is minimized, and the transmittance of the dimming glass 3B is maximized. In the present embodiment, glass becomes most transparent when transmittance is set to maximum and becomes opaquest when the transmittance is set to minimum. With this configuration, a video can be shown in an arbitrary direction.

In either case, ease of viewing of a vehicle exterior from a vehicle interior is lower when a video is being output than when no video is output.

The vehicle-mounted device 100 receives advertisement data from the server apparatus 200 and performs control that outputs an advertisement via the display device 110.

Additionally, the vehicle-mounted device 100 detects that a driver is about to make a visual confirmation of a vehicle side portion and suspends advertisement output by the display device 110 built into a windowpane lying in a corresponding direction. This allows increase in transmittance of the windowpane and the driver's vision can be secured.

In the following description, an operation of visually confirming a side portion of the vehicle by the driver will be referred to as a confirmation operation.

Elements constituting the system will be described.

The vehicle 10 is a connected car having a communication function with an external network. The vehicle 10 is configured to include the vehicle-mounted device 100 and the plurality of display devices 110. Note that although a single vehicle-mounted device is illustrated as an example in FIG. 1, the vehicle 10 may include a plurality of vehicle-mounted devices or ECUs.

Figure 4:
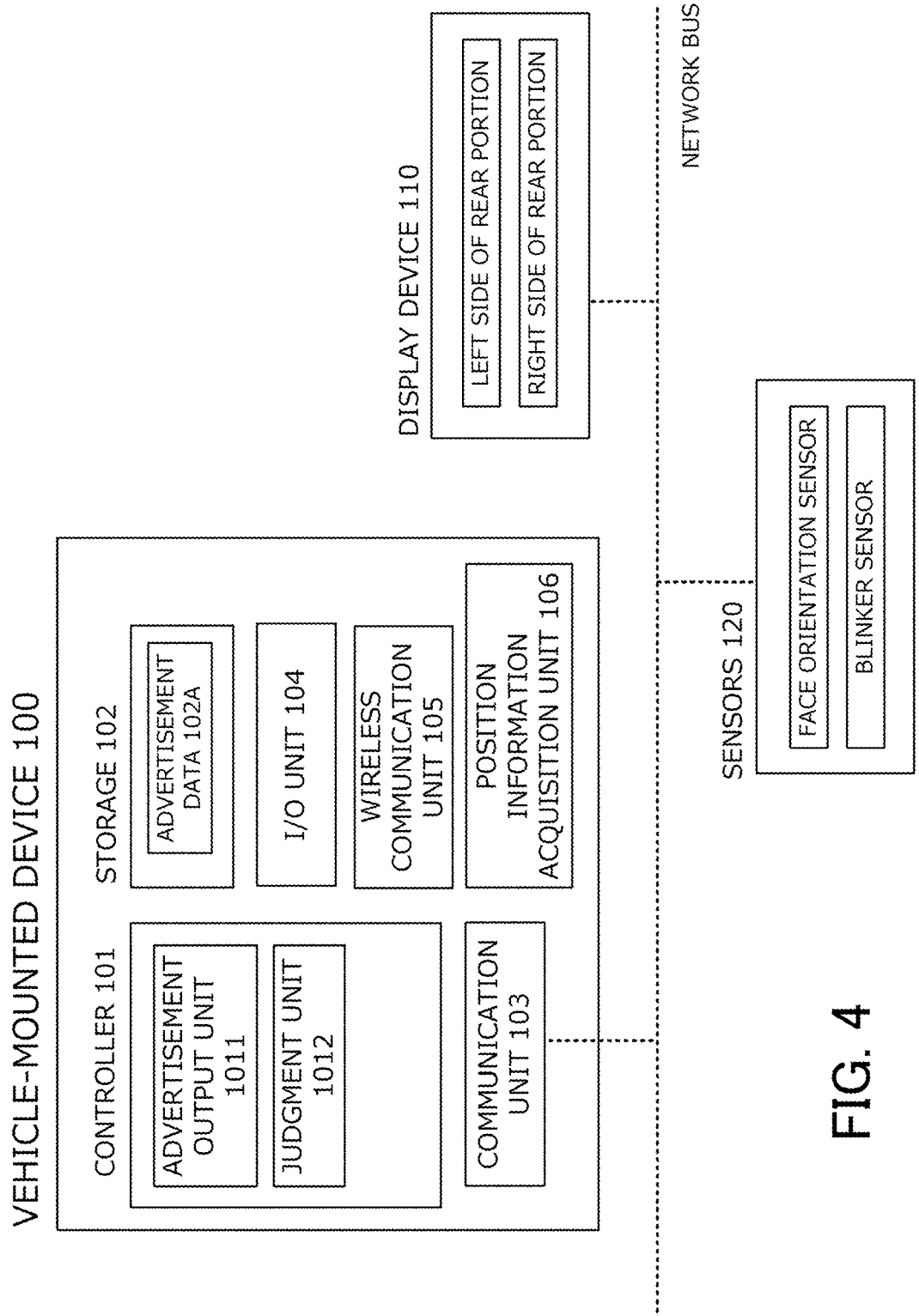
FIG. 4 is a diagram for explaining constituent elements of a vehicle 10.

FIG. 4 is a diagram for explaining constituent elements of the vehicle 10 according to the present embodiment. The vehicle 10 according to the present embodiment is configured to include the vehicle-mounted device 100, the display device 110, and sensors 120. The display device 110 will be described first.

In the present embodiment, the vehicle 10 is configured to include a plurality of display devices 110 which are arranged to face the outside of the vehicle, as illustrated in FIG. 2. In the present embodiment, the respective display devices 110 are arranged in left and right windowpanes which are provided at a backseat. In the description of the embodiment, the display device arranged on a left side in a traveling direction is referred to as a display device 110L, and the display device arranged on a right side in the traveling direction is referred to as a display device 110R.

Although the display device 110 is typically a liquid crystal display, the display device 110 can also be constructed using an organic EL display, an LED matrix, a projector, or the like.

Note that although only the display panel and the dimming glass are illustrated in FIG. 3, the display device 110 may include a unit which controls image output, transmittance of dimming glass, and the like.

Note that the number of display devices 110 may differ depending on the type or model of the vehicle 10. The display devices 110 may be arranged at a plurality of positions, such as a left side surface, a right side surface, and the vehicle rear portion.

As described earlier, the display device 110 reduces transmittance of the windowpane during video output. In other words, visibility from the vehicle interior in the vehicle exterior direction decreases during video output.

The vehicle-mounted device 100 will be described.

The vehicle-mounted device 100 is a device which controls advertisement output using the display device 110. The vehicle-mounted device 100 receives advertisement data from the server apparatus 200 and performs advertisement output control based on the received advertisement data.

Additionally, the vehicle-mounted device 100 detects that a driver is about to visually confirm the vehicle exterior, based on a result of sensing the driver. The vehicle-mounted device 100 also performs control that temporarily stops advertisement output to enhance the visibility from the vehicle interior in the vehicle exterior direction, based on a result of the detection.

The vehicle-mounted device 100 may be a device (e.g., a car navigation device) which provides information to an occupant of the vehicle. The vehicle-mounted device 100 is also called a car navigation device, an infotainment device, or a head unit. Navigation or entertainment can be provided to the occupant of the vehicle by the vehicle-mounted device 100.

The vehicle-mounted device 100 has a function of wireless communication with an external network. The vehicle-mounted device 100 may have a function of downloading traffic information, road map data, music and moving images, and the like by communicating with the external network for the vehicle 10. Alternatively, the vehicle-mounted device 100 may be a device capable of coordinating with a smartphone and the like.

The vehicle-mounted device 100 can be constructed as a computer including a processor, such as a CPU or a GPU, a main memory, such as a RAM or a ROM, and an auxiliary memory, such as an EPROM, a hard disk drive, or a removable medium. An operating system (OS), various types of programs, various types of tables, and the like are stored in the auxiliary memory. Functions suiting a predetermined purpose, as will be described later, can be implemented by executing a program stored in the auxiliary memory. Note that some or all of the functions may be implemented by a hardware circuit, such as an ASIC or an FPGA.

The vehicle-mounted device 100 is configured to include a controller 101, a storage 102, a communication unit 103, an I/O unit 104, a wireless communication unit 105, and a position information acquisition unit 106.

The controller 101 is an arithmetic unit which implements various types of functions of the vehicle-mounted device 100 by executing a predetermined program. The controller 101 may be implemented by, for example, a CPU.

The controller 101 is configured to include two functional modules; an advertisement output unit 1011 and a judgment unit 1012. Each functional module may be implemented by execution of a stored program by a CPU.

The advertisement output unit 1011 acquires, from the server apparatus 200, data (advertisement data) related to advertisement content to be output to the display device 110 and controls output of the data.

The acquisition of the advertisement data is preferably performed immediately before the vehicle 10 starts running or during running, but is not limited to this. The acquisition of the advertisement data can be performed, for example, at a time when an ignition is turned on, at a time when a destination is set, or at a time when running is started.

Note that the advertisement output unit 1011 may transmit information related to the vehicle to the server apparatus 200 to acquire appropriate advertisement data.

The advertisement output unit 1011 also outputs an image and the like included in the advertisement data to the display device 110. Note that, if conditions for outputting advertisement content are set, the advertisement output unit 1011 may perform advertisement output only when the conditions are matched.

The judgment unit 1012 detects a confirmation operation made by a driver of the vehicle 10.

Figure 5:
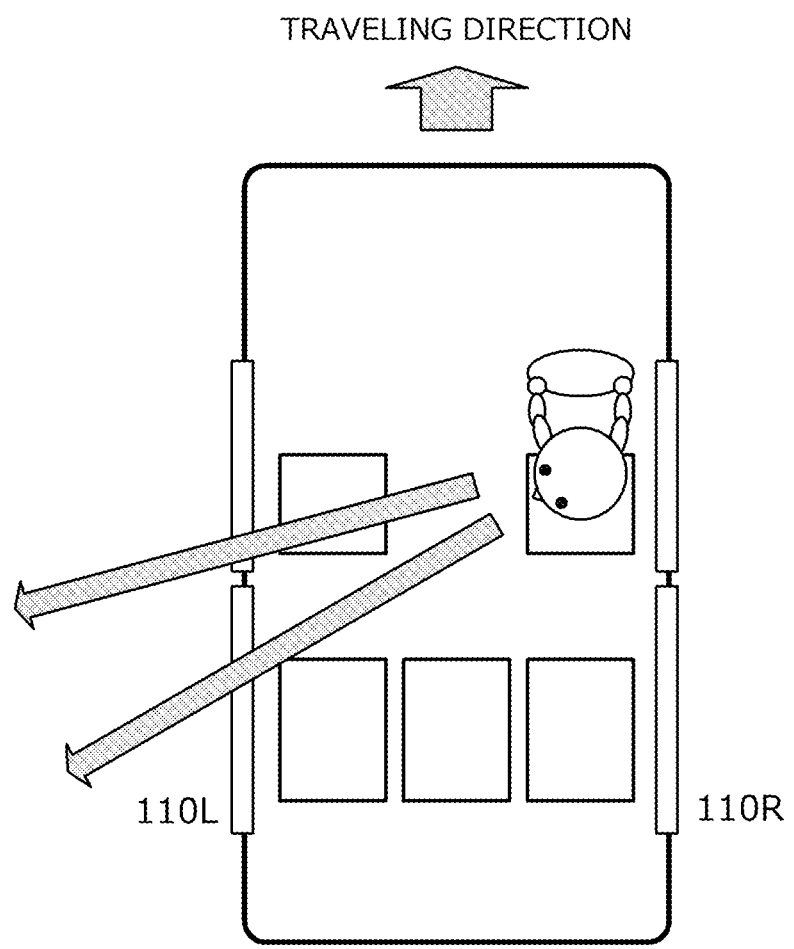
FIG. 5 is a top view for explaining a visual confirmation by a driver.

FIG. 5 is a top view of the running vehicle 10. As illustrated in FIG. 5, the driver of the vehicle 10 may directly make a visual confirmation of a side portion of the vehicle by turning his/her head. However, if a display device (the display device 110L in the present example) is outputting an advertisement, a view of the vehicle exterior from the vehicle interior may be blocked. The judgment unit 1012 judges that the driver is viewing a side portion of the vehicle, based on an orientation of a face of the driver. In this case, the judgment unit 1012 performs control that temporarily stops advertisement output. In the example illustrated in FIG. 5, since the driver faces a left-side rear portion, outputting of an advertisement being output to the display device 110L at the left-side rear portion is temporarily stopped. This allows enhancement of transmittance of a windowpane located at a corresponding position and enhancement of visibility.

The storage 102 is configured to include a main memory and an auxiliary memory. The main memory is a memory into which a program to be executed by the controller 101 and data to be used by the control program are to be deployed. The auxiliary memory is a device in which a program to be executed by the controller 101 and data to be used by the control program are stored. An operating system for execution of a program may be stored in the auxiliary memory. A program stored in the auxiliary memory is loaded into the main memory and is executed by the controller 101, thereby implementing the functions described earlier. Advertisement content data (advertisement data 102A) received from the server apparatus 200 is stored in the storage 102.

The communication unit 103 is a communication interface for connection of the vehicle-mounted device 100 to a bus of a vehicle-mounted network.

The I/O unit 104 is a unit configured to accept an input manipulation performed by a user and present information to the user. Specifically, the I/O unit 104 is composed of a touch panel and a control unit therefor, and a liquid crystal display and a control unit therefor. The touch panel and the liquid crystal display are made up of one touch panel display in the present embodiment. The I/O unit 104 may include a unit (an amplifier or a speaker) which outputs audio, a unit (a microphone) which inputs audio, and the like.

The wireless communication unit 105 includes an antenna for wireless communication and a communication module. The antenna is an antenna element which inputs and outputs a wireless signal. In the present embodiment, the antenna is adapted to mobile communications (e.g., mobile communication such as 3G, LTE, or 5G). Note that the antenna may be configured to include a plurality of physical antennas. For example, when mobile communication using radio waves in a high-frequency band, such as microwaves or milliwaves, are performed, a plurality of antennas may be dispersedly arranged to achieve communication stabilization. The communication module is a module for mobile communication.

The position information acquisition unit 106 includes a GPS antenna and a positioning module for measuring position information. The GPS antenna is an antenna which receives a positioning signal transmitted from a positioning satellite (also referred to as a GLASS satellite). The positioning module is a module which calculates position information based on a signal received by the GPS antenna.

The display device 110 is a display device built into a windowpane of the vehicle 10. The display device 110 is composed of the transmissive display panel 3 and the two sheets of dimming glass 3A and 3B, as illustrated in FIG. 3. For example, a video displayed on the transmissive display panel can be provided to the vehicle exterior by maximizing the transmittance of the dimming glass 3A and minimizing the transmittance of the dimming glass 3B. A video displayed on the transmissive display panel can be provided to the vehicle interior by minimizing the transmittance of the dimming glass 3A and maximizing the transmittance of the dimming glass 3B. In the present embodiment, the display device 110 is configured to include the display device 110L installed at a rear glass on the left side in the traveling direction and the display device 110R installed at a rear glass on the right side in the traveling direction.

Note that, although a transmissive display panel is illustrated as means for displaying an image in the present embodiment, an image may be projected by a projector or the like which is installed in the vehicle interior. In this case, a dimming glass functions as a screen.

The sensors 120 include a plurality of sensors of the vehicle platform. In the present embodiment, the sensors 120 are configured to include a sensor (hereinafter referred to as a face orientation sensor) which detects an orientation of a face of a driver and a sensor (hereinafter referred to as a blinker sensor) which detects an operation status of blinkers.

The face orientation sensor is configured to include, for example, a camera installed to face a driver seat. The face orientation sensor may include a unit which performs image processing on an image acquired by the camera and calculates an angle of the face of the driver.

The blinker sensor is a device which senses the operation status (e.g., whether a left blinker is turned on or a right blinker is turned on) of the blinkers of the vehicle 10.

The network bus is a communication bus constituting the vehicle-mounted network. Note that, although one bus is illustrated in the present example, the vehicle 10 may have two or more communication buses. The plurality of communication buses may be connected to each other by a gateway which puts together the plurality of communication buses.

The server apparatus 200 will be described.

The server apparatus 200 is an apparatus which delivers advertisement data to the vehicle 10 (the vehicle-mounted device 100).

Figure 6:
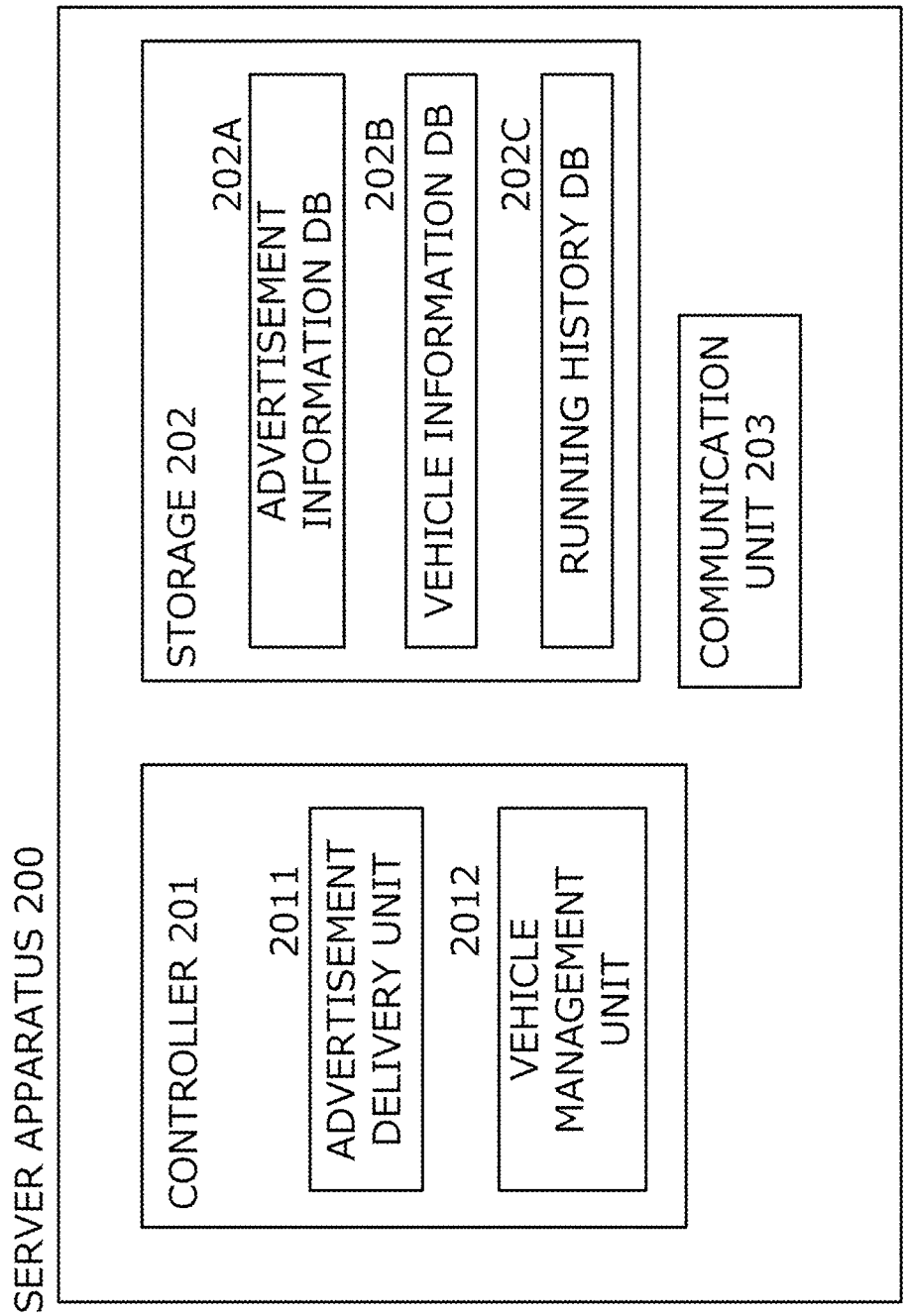
FIG. 6 is a diagram for explaining constituent elements of a server apparatus 200.

FIG. 6 is a diagram illustrating in detail constituent elements of the server apparatus 200 included in the vehicle system according to the present embodiment.

The server apparatus 200 can be constructed as a computer including a processor, such as a CPU or a GPU, a main memory, such as a RAM or a ROM, and an auxiliary memory, such as an EPROM, a hard disk drive, or a removable medium. An operating system (OS), various types of programs, various types of tables, and the like are stored in the auxiliary memory. A program stored in the auxiliary memory is loaded into a work region of the main memory and is executed, and constituent units and the like are controlled through the execution of the program, thereby implementing functions suiting a predetermined purpose, as will be described later. Note that some or all of the functions may be implemented by a hardware circuit, such as an ASIC or an FPGA.

The server apparatus 200 is configured to include a controller 201, a storage 202, and a communication unit 203.

The controller 201 is an arithmetic device which is responsible for control to be performed by the server apparatus 200. The controller 201 can be implemented by an arithmetic processing device, such as a CPU.

The controller 201 is configure to include two functional modules; an advertisement delivery unit 2011 and a vehicle management unit 2012. Each functional module may be implemented by execution of a program stored in the auxiliary storage by a CPU.

The advertisement delivery unit 2011 determines an advertisement to be posted by one or more vehicles 10 under control of the system and transmits corresponding advertisement data to the vehicles 10. A vehicle as an object to which an advertisement is to be delivered is determined based on information collected by the vehicle management unit 2012, which is to be described later.

The vehicle management unit 2012 communicates periodically with a plurality of vehicles 10 and collects information on the vehicles. The information on the vehicles 10 includes, for example, information on the vehicles themselves (hereinafter referred to as vehicle information), information on running of the vehicles (hereinafter referred to as running history information), and the like.

The storage 202 is configured to include a main memory and an auxiliary memory. The main memory is a memory into which a program to be executed by the controller 201 and data to be used by the control program are to be deployed. The auxiliary memory is a device in which a program to be executed by the controller 201 and data to be used by the control program are stored. The main memory and the auxiliary memory are the same as the storage 102, and a detailed description thereof will be omitted.

Additionally, the storage 202 stores an advertisement information database 202A, a vehicle information database 202B, and a running history database 202C.

The advertisement information database 202A is a database which stores data related to an advertisement (advertisement data) to be delivered to the vehicle 10. The data are generated by an advertiser.

The vehicle information database 202B is a database which stores data related to attributes and features of the vehicle 10. The data are generated at the time of registering the vehicle 10 in the system.

The running history database 202C is a database which stores a running history of the vehicle 10. The running history includes, for example, a route and points through which the vehicle 10 has run, an advertisement posted status, an identifier of an advertisement being posted, and the like. The data are updated at any time based on information received from the vehicle 10.

The above-described databases are constructed when a program of a database management system (DBMS) to be executed by the processor manages data stored in the memories. A database to be used in the present embodiment is, for example, a relational database.

Here, data to be stored in the advertisement information database 202A will be described with reference to FIG. 7. FIG. 7 is an example of the data to be stored in the advertisement information database 202A. As illustrated in FIG. 7, an advertisement identifier (advertisement ID), information on advertisement genre and attributes, information on conditions for posting an advertisement, information specifying requirements for a vehicle which posts the advertisement, content data, and the like are stored in the advertisement information database 202A.

The content data is, for example, still image data, continuous image data, or moving image data. An individual record stored in the advertisement information database 202A is referred to as advertisement data.

Data to be stored in the vehicle information database 202B will be described with reference to FIG. 8. FIG. 8 is an example of the data to be stored in the vehicle information database 202B. A vehicle type and information on display devices are stored in the vehicle information database 202B. Although the information on display devices includes, for example, the number of display devices, installation positions, display areas, and the like, other information may be included.

Data to be stored in the running history database 202C will be described with reference to FIG. 9. FIG. 9 is an example of the data to be stored in the running history database 202C. A vehicle identifier (vehicle ID), a date and time, position information (e.g., latitude and longitude) of the vehicle 10, a traveling direction, a velocity, an advertisement output status, an advertisement identifier (advertisement ID), and the like are stored in the running history database 202C.

The advertisement output status is, for example, information representing an advertisement posted status, such as "OUTPUTTING" or "NO OUTPUT." If an advertisement is not posted for some reason, such as the reason that the vehicle 10 is running outside an area specified by an advertiser or the reason that the vehicle 10 is running outside specified hours, the reason may be included in the field.

How to use data stored in the databases will be described later.

The communication unit 203 is a communication interface for connection of the server apparatus 200 to a network. The communication unit 203 is configured to include, for example, a network interface board or a wireless communication interface for wireless communication.

Note that the configurations illustrated in FIGS. 4 and 6 are examples and that all or some of the illustrated functions may be executed using a specifically designed circuit. Program storage or execution may be performed by a combination of a main memory and an auxiliary memory other than the illustrated ones.

Figure 10:
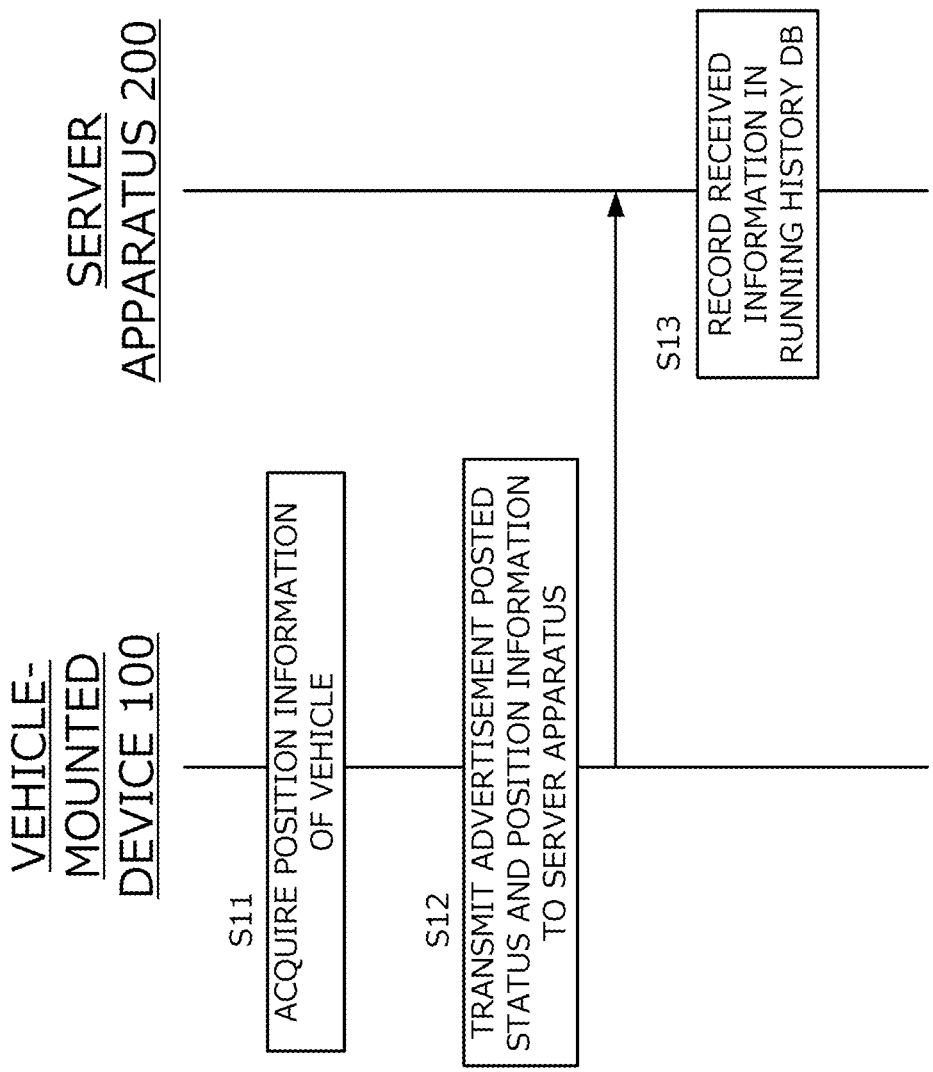
FIG. 10 is a sequence chart of a process of transmitting information to the server apparatus by a vehicle-mounted device.

A process of delivering an advertisement to the vehicle 10 by the server apparatus 200 will be described. FIG. 10 is a sequence chart of data to be transmitted and received between the vehicle-mounted device 100 and the server apparatus 200.

First, in step S11, the vehicle-mounted device 100 (the advertisement output unit 1011) acquires position information of the vehicle via the position information acquisition unit 106.

In step S12, the vehicle-mounted device 100 (the advertisement output unit 1011) transmits an advertisement posted status and the position information of the vehicle to the server apparatus. The advertisement posted status includes information representing whether the vehicle 10 is outputting the advertisement. For example, if the vehicle 10 is outputting an advertisement, an identifier of the advertisement, an output status, and the like are transmitted to the server apparatus. Note that, in the present step, the vehicle-mounted device 100 may acquire information (e.g., a velocity and a traveling direction) on running and simultaneously transmit the information to the server apparatus 200.

In step S13, the server apparatus 200 (the vehicle management unit 2012) stores the received information in the running history database 202C.

Figure 11:
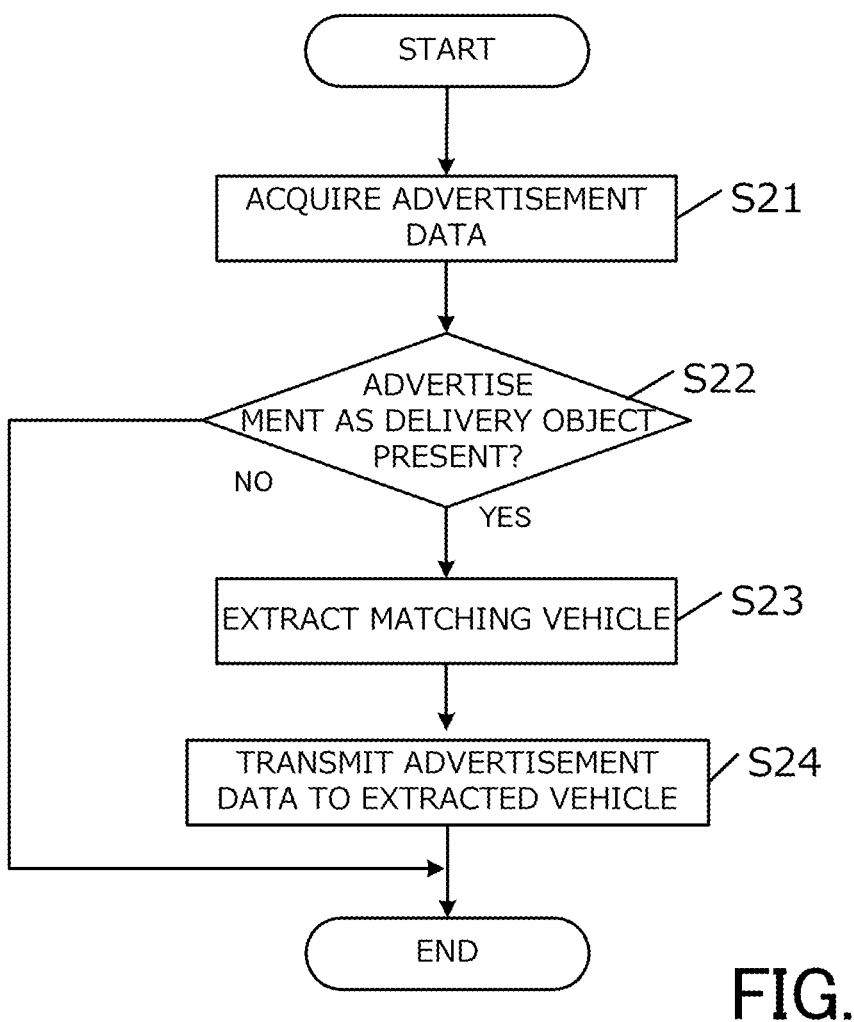
FIG. 11 is a flowchart of a process of delivering an advertisement to the vehicle-mounted device by the server apparatus.

FIG. 11 is a flowchart of a process of delivering an advertisement to the vehicle 10 by the server apparatus 200. The illustrated process is periodically executed.

First, in step S21, the advertisement delivery unit 2011 acquires advertisement data recorded in the advertisement information database 202A. In step S22, the advertisement delivery unit 2011 judges whether there is an advertisement meeting conditions among the acquired advertisement data. For example, if there is an advertisement, specified posting hours of which match a current date and time, an affirmative judgment is made in step S22. If there is a matching advertisement, a corresponding record is temporarily stored in a predetermined region of the storage 202.

In step S23, the advertisement delivery unit 2011 refers to the vehicle information database 202B and extracts a vehicle which matches the extracted advertisement. In the present step, the advertisement delivery unit 2011 a vehicle which satisfies requirements (e.g., a vehicle type, a display device position, a display device area, and a running area) specified in the advertisement data is extracted.

In step S24, the advertisement delivery unit 2011 transmits the advertisement data to the extracted vehicle.

Figure 12:
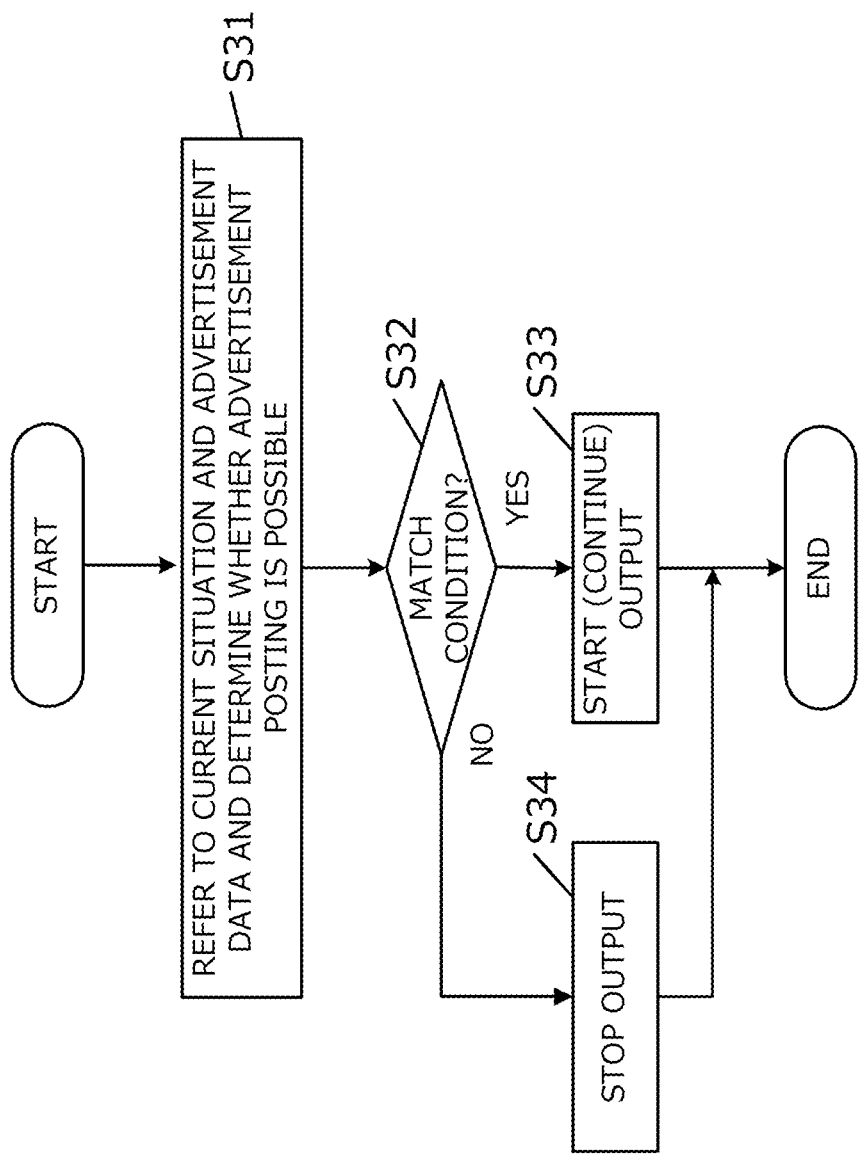
FIG. 12 is a flowchart of a process of outputting an advertisement by the vehicle-mounted device.

FIG. 12 is a flowchart of a process to be executed by the vehicle-mounted device 100 (the advertisement output unit 1011) that has received advertisement data.

First, in step S31, a current situation is compared with conditions set in the received advertisement data, and it is determined whether to post an advertisement.

For example, if a specification to the effect that the advertisement is posted only within a predetermined area is made in the advertisement data, whether advertisement posting is possible is determined based on a result of comparing the condition on the area with position information acquired via the position information acquisition unit 106. If a specification to the effect that the advertisement is posted only during predetermined hours is made in the advertisement data, whether advertisement posting is possible is determined based on a result of comparing the condition on the hours with a current date and time. Note that, although an area and hours are illustrated here as conditions for determining whether advertisement posting is possible, any other condition may be adopted as long as the vehicle 10 can make a judgment on the condition.

If a result of the judgment in step S31 indicates that the conditions are matched (YES in step S32), the process shifts to step S33, and advertisement output is started (continued if the advertisement output is already going on). Note that the vehicle 10 stores a plurality of pieces of advertisement data, an advertisement to be output may be selected in accordance with a predetermined condition.

If the conditions are not matched (NO in step S32), the process shifts to step S34, and the advertisement output is ended.

With the above-described processes, advertisement posting by the vehicle 10 is performed.

The advertisement posting is performed by outputting a video to the transmissive display panel 3 of the display device 110. At this time, the vehicle-mounted device 100 executes a process of decreasing the transmittance of the dimming glass 3A. This makes the video visually recognizable from outside the vehicle 10.

Figure 13:
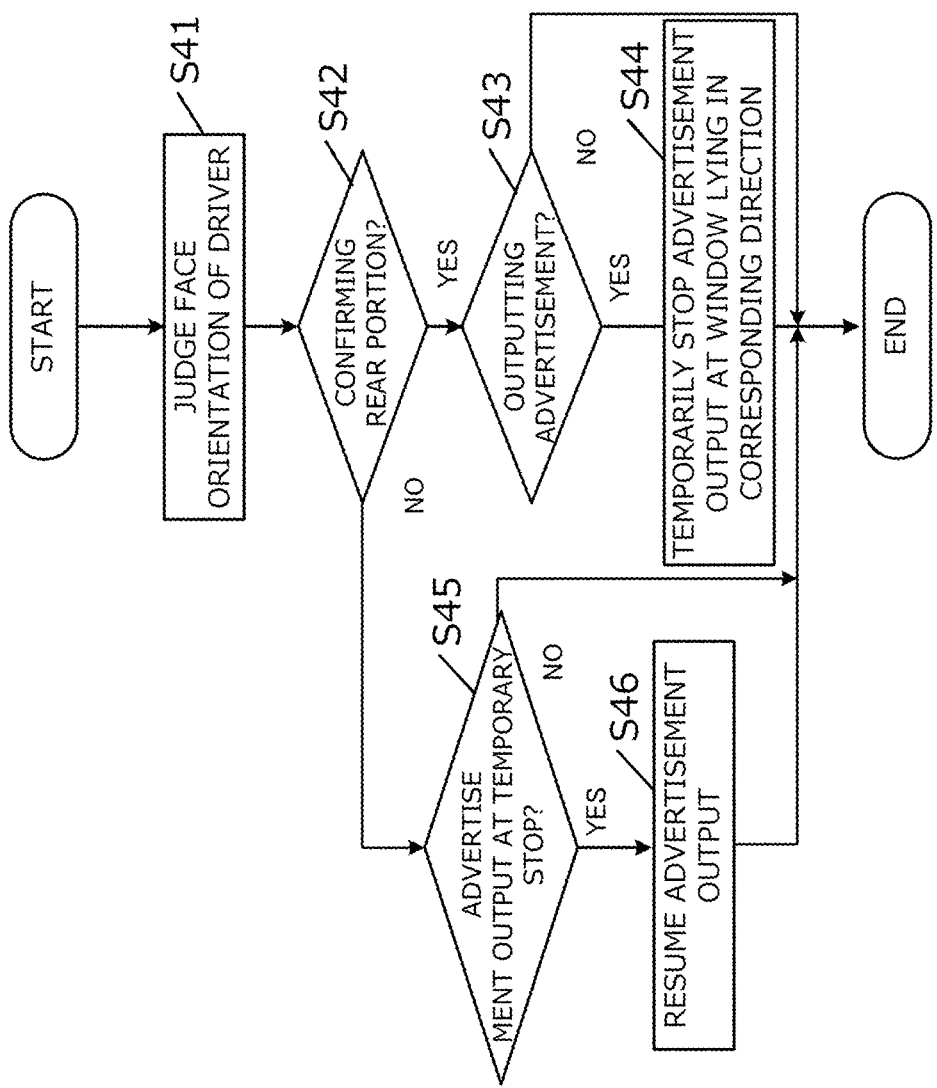
FIG. 13 is a flowchart of a process of temporarily stopping advertisement output based on a face orientation of a driver.

On the other hand, as described earlier, reduction in transmittance of a dimming glass makes it difficult to visually recognize the vehicle exterior from the vehicle interior, which may affect a safety confirmation. For this reason, the vehicle-mounted device 100 executes a process of temporarily stopping advertisement output and securing a driver's vision based on an orientation of a face (hereinafter referred to as a face orientation) of the driver. FIG. 13 is a flowchart of the process. The process is periodically executed by the judgment unit 1012 while the vehicle 10 is running.

First, in step S41, the face orientation of the driver is judged using the face orientation sensor included in the sensors.

In step S42, it is judged whether the driver is performing a confirmation operation. If the face of the driver faces a diagonally rear portion of the vehicle, it can be judged that the driver is performing a confirmation operation. In this case, the process shifts to step S43.

In step S43, it is judged whether an advertisement is being output by the advertisement output unit 1011. If an affirmative judgment is made in the present step, the process shifts to step S44 to temporarily stop advertisement output using a windowpane lying in a corresponding direction. For example, if the driver is making a confirmation of a side portion on the right side in the traveling direction, advertisement output to the display device 110R is stopped. If the driver is making a confirmation of a side portion on the left side in the traveling direction, advertisement output to the display device 110L is stopped. At this time, the judgment unit 1012 performs control that enhances transmittance on the dimming glass 3A. Note that the control that changes transmittance may be executed by the vehicle-mounted device 100, as described in the present example, or may be performed by a control unit built into the display device 110.

Note that to enhance transmittance means to set the transmittance within a predetermined range which does not interfere with a safety confirmation.

If a negative judgment is made in step S42, i.e., if the driver is not making a visual confirmation of a vehicle side portion, the process shifts to step S45.

In step S45, it is judged whether advertisement output is at a temporary stop. If advertisement output is temporarily stopped due to execution of step S44, an affirmative judgment is made in the present step, and the process shifts to step S46.

In step S46, advertisement output at a temporary stop is resumed. If a negative judgment is made in step S45, the process ends.

As described above, if a driver is making a visual confirmation of a vehicle side portion, and an advertisement is being output using a windowpane, the vehicle-mounted device 100 according to the first embodiment temporarily stops outputting the advertisement and increases transmittance of the windowpane. This configuration allows securement of safety when a vehicle is running.

Second Embodiment

In the first embodiment, it is judged based on a face orientation of a driver that a confirmation operation is being performed. On the other hand, since there is a time lag between when a face orientation of a driver is sensed and when transmittance of a windowpane changes, the configuration may cause a period of time during which a visual confirmation by the driver is blocked. To cope with this, in a second embodiment, it is predicted that a driver of a vehicle will perform a confirmation operation, based on data (first data) acquired from a vehicle platform, and advertisement output is stopped in advance.

In the second embodiment, a judgment unit 1012 acquires data from a blinker sensor included in sensors 120 and, if one of blinkers of a vehicle operates, predicts that a confirmation operation for a lane change or a right or left turn will be performed. The operation of the blinker of the vehicle can be regarded as a sign of the confirmation operation.

Figure 14:
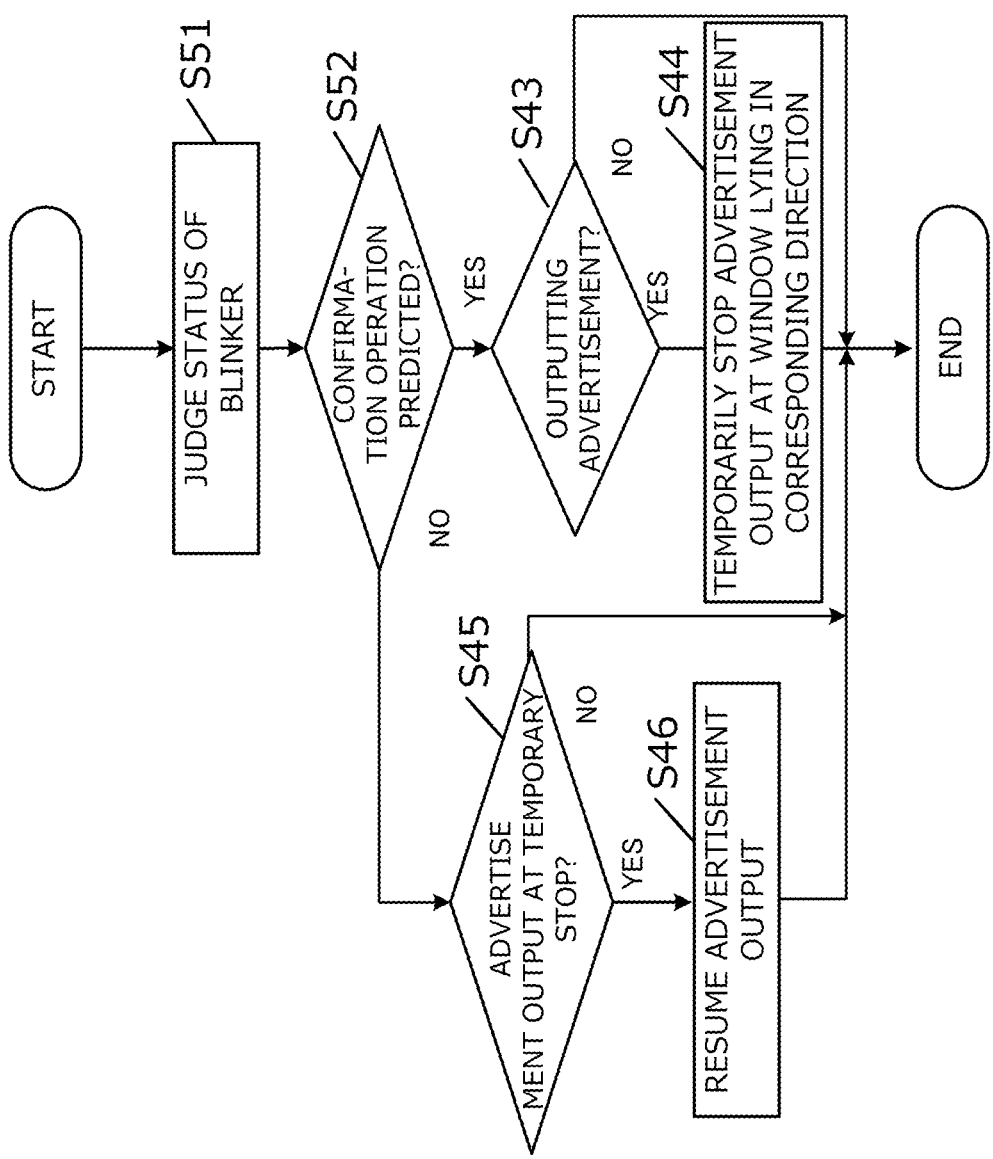
FIG. 14 is a flowchart of a process of temporarily stopping advertisement output based on an operating situation of blinkers.

FIG. 14 is a flowchart of a process to be executed by a vehicle-mounted device 100 according to the second embodiment. The process is periodically executed by the judgment unit 1012 while a vehicle 10 is running. The same processes as in the first embodiment are indicated by dotted lines, and a detailed description thereof will be omitted. Note that the process is executed in parallel to the process illustrated in FIG. 13.

First, in step S51, an operation status of the blinkers is judged based on data acquired from the blinker sensor. The status can have, for example, the three values: "RIGHT BLINKER IN OPERATION," "LEFT BLINKER IN OPERATION," and "NO OPERATION."

In step S52, it is judged whether a confirmation operation is predicted. The judgment may be made using another sensor data acquired from a vehicle platform or a vehicle-mounted device (e.g., a navigation device) together. For example, if a left blinker is turned on before an intersection, a confirmation operation for prevention of an accident is predicted. If a right blinker is turned on near a middle of the intersection, it is highly likely that a confirmation operation will not be performed (the both cases are left-side traffic cases). Whether a confirmation operation is performed can change depending on a velocity of the vehicle 10.

In the present step, the judgment may be made using data in which a status of the vehicle 10 which is judged based on sensor data acquired from the vehicle platform and a result of predicting a confirmation operation are associated with each other. The data may be a table, a machine learning model, or the like.

If an affirmative judgment is made in step S52, the process shifts to step S43 to perform control that temporarily stops advertisement output by the same method as in the first embodiment.

If a negative judgment is made in step S52, the process shifts to step S45 to perform control that resumes advertisement output by the same method as in the first embodiment.

According to the second embodiment, control that temporarily stops advertisement output based on the status of the blinkers of the vehicle 10 in addition to a face orientation of a driver is performed. This configuration allows reduction in transmission of a windowpane before a confirmation operation and reduction in discomfort brought to a driver.

Note that, if the face orientation of the driver does not change (a confirmation operation is not detected) even after a lapse of a predetermined time period since advertisement output is stopped, a negative judgment may be made in step S52 to resume advertisement output.

In the present embodiment, advertisement output is stopped as in the first embodiment. However, advertisement output need not be completely stopped as long as a preliminary operation for enhancement of visibility of a vehicle exterior from a vehicle interior can be performed. For example, only transmittance of a windowpane may be reduced by a small amount while an advertisement remains output.

Although the process illustrated in FIG. 13 and the process illustrated in FIG. 14 are executed in parallel (in other words, advertisement output is stopped if either condition is satisfied) in the second embodiment, advertisement output may be stopped if the both conditions are satisfied. That is, advertisement output may be stopped if both the condition (1) that a blinker be in operation and the condition (2) that a face of a driver faces a diagonally rear portion are met.

Third Embodiment

In the first or second embodiment, advertisement output is unconditionally stopped if a face of a driver faces a diagonally rear portion. However, in some cases, advertisement output should not be stopped in a situation where a visual confirmation is not required, even if a driver faces a side portion or a rear portion. For example, if a vehicle 10 is not expected to start immediately, such as when a shift position is in park, advertisement output should not be stopped even if a face of the driver faces the side portion or the rear portion.

In a third embodiment, to cope with the above-described problem, it is judged based on a status of the vehicle 10 whether to stop advertisement output.

In the third embodiment, a storage 102 stores data in which the status of the vehicle 10 is associated with a window as an object to be controlled. Note that the present embodiment assumes that a display device is also built into a windowpane at a back surface of the vehicle 10.

FIG. 15 is an example of the above-described data (second data). In the present example, for example, if the shift position of the vehicle is in "PARK," control that stops an advertisement is not performed for all windows. If the shift position of the vehicle is in "DRIVE," control that stops an advertisement is performed for windows except one at the back surface. If the shift position of the vehicle is "REVERSE," control that stops an advertisement is performed for all the windows. Note that, although only the shift position is illustrated as an example of the status of the vehicle 10, information other than this, such as a vehicle velocity or a status of a parking brake, may be used together.

The judgment on the status of the vehicle 10 can be executed by a judgment unit 1012, for example, before execution of the process in step S41 (or S51). If a window which is not an object to be controlled is present, the process in step S44 is skipped for the window.

As described above, according to the third embodiment, an exception can be made to advertisement output stop control, and useless advertisement stop can be inhibited.

(Modifications)

The above-described embodiments are merely examples, and the present disclosure can be carried out by being appropriately changed without departing from the scope thereof.

For example, the processes and units described in the present disclosure can be freely combined and carried out as long as there is no technical contradiction.

Although an example which changes transmittance of a windowpane provided at a backseat of a vehicle has been taken in the description of the embodiments, transmittance of a windowpane other than this may be changed if the change is permitted by the legal system.

The transmittance change may not be performed for an entire surface of a windowpane and may be performed for a part.

Although a vehicle which outputs an advertisement by the display device 110 is illustrated as an example in the description of the embodiments, the present disclosure can be applied to another vehicle as long as transmittance of a windowpane is dynamically changeable in the vehicle. As such a vehicle, for example, a vehicle in which transmittance of a windowpane is changeable for the purpose of protection against the sun can be illustrated.

A vehicle which shows a video to a vehicle exterior by reducing transmittance of the dimming glass 3A is illustrated as an example in the description of the embodiments. It is also possible to show a video (e.g., for entertainment) to a vehicle interior by reducing transmittance of the dimming glass 3B. Even in such a vehicle, the same effect can be obtained by controlling transmittance of the dimming glass.

Processing described as being performed by one apparatus may be shared and executed by a plurality of apparatuses. Or alternatively, processing described as being performed by different apparatuses may be executed by one apparatus. In a computer system, what hardware configuration (server configuration) each function is realized by can be flexibly changed.

The present disclosure can be realized by supplying a computer program implemented with the functions described in the above embodiments to a computer, and one or more processors that the computer has reading out and executing the program. Such a computer program may be provided for the computer by a non-transitory computer-readable storage medium connectable to a system bus of the computer or may be provided for the computer via a network. As the non-transitory computer-readable storage medium, for example, a disk of a given type such as a magnetic disk (a floppy (R) disk, a hard disk drive (HDD) and the like) and an optical disc (a CD-ROM, a DVD disc, a Blu-ray disc and the like), a read-only memory (ROM), a random-access memory (RAM), an EPROM, an EEPROM, a magnetic card, a flash memory, an optical card, and a medium of a given type that is appropriate for storing electronic commands are included.

What is claimed is:

1. An information processing device comprising
a controller comprising at least one processor configured to execute non-transitory program instructions stored in a memory to execute:
detecting that a confirmation operation that is an operation of visually confirming a side portion of a first vehicle is performed by a driver of the first vehicle;
performing control that sets transmittance of a window lying in a corresponding direction at a predetermined value if the confirmation operation is detected,
if a blinker operates, predicting whether the confirmation operation will be performed based on information regarding the operation of the blinker and sensor data obtained from a vehicle platform of the first vehicle or a vehicle-mounted device installed in the first vehicle; and
if it is predicted that the confirmation operation will be performed, setting transmittance of a window lying on a side corresponding to the blinker of the first vehicle at the predetermined value in advance.

2. The information processing device according to claim 1, wherein
the first vehicle has a plurality of windows capable of outputting a video and changing the transmittance.

3. The information processing device according to claim 2, wherein
the controller stops the video from being output at the window lying in the corresponding direction if the confirmation operation is detected while the video is being output at one or more windows of the first vehicle.

4. The information processing device according to claim 2, wherein
the controller stops the video from being output at the window lying in the corresponding direction and sets the transmittance of the window lying in the corresponding direction at the predetermined value, if the confirmation operation is detected while the video is being output at one or more windows of the first vehicle.

5. The information processing device according to claim 1, wherein
the controller detects the confirmation operation by a camera of the first vehicle which captures a face of the driver.

6. The information processing device according to claim 1, wherein
the controller detects a sign of the confirmation operation based on first data acquired from one or more sensors of the first vehicle.

7. The information processing device according to claim 6, wherein
the controller sets transmittance of a window lying in a direction corresponding to an expected confirmation operation at the predetermined value if the sign of the confirmation operation is detected.

8. The information processing device according to claim 1, further comprising
a storage configured to store second data in which a window as an object to be subjected to the control is associated with a status of the first vehicle.

9. The information processing device according to claim 8, wherein
the controller determines the window as the object to be subjected to the control based on the status of the first vehicle and the second data.

10. A vehicle comprising a display device that outputs a video using a window as a medium and a control device,
wherein the display device includes
a transmissive display panel configured to output the video and a dimming glass configured to change transmittance of the window,
wherein the control device includes a controller comprising at least one processor configured to execute program instructions stored in a memory to:
detect that a confirmation operation that is an operation of visually confirming a side portion of the vehicle is performed by a driver;
perform control that sets the transmittance of the window lying in a corresponding direction at a predetermined value if the confirmation operation is detected,
if a blinker operates, predict whether the confirmation operation will be performed based on information regarding the operation of the blinker and sensor data obtained from a vehicle platform of the first vehicle or a vehicle-mounted device installed in the first vehicle; and
if it is predicted that the confirmation operation will be performed, set transmittance of a window lying on a side corresponding to the blinker of the first vehicle at the predetermined value in advance.

11. The vehicle according to claim 10, wherein
the control device stops the video from being output at the window lying in the corresponding direction if the confirmation operation is detected while the video is being output at one or more of the windows.

12. The vehicle according to claim 10, wherein
the control device stops the video from being output at the window lying in the corresponding direction and sets the transmittance of the window lying in the corresponding direction at the predetermined value if the confirmation operation is detected while the video is being output at one or more of the windows.

13. The vehicle according to claim 10, further comprising a camera that captures a face of the driver, wherein
the control device detects the confirmation operation by the camera.

14. The vehicle according to claim 10, wherein
the control device detects a sign of the confirmation operation based on data acquired from one or more sensors of the vehicle.

15. The vehicle according to claim 14, wherein
the control device sets transmittance of a window lying in a direction corresponding to an expected confirmation operation at the predetermined value if the sign of the confirmation operation is detected.

16. The vehicle according to claim 10, further comprising
a storage configured to store second data in which a window as an object to be subjected to the control is associated with a status of the vehicle.

17. The vehicle according to claim 16, wherein
the control device determines the window as the object to be subjected to the control based on the status of the vehicle and the second data.

* * * * *